(12) United States Patent
Murphree et al.

(10) Patent No.: US 10,876,378 B2
(45) Date of Patent: Dec. 29, 2020

(54) OUTFLOW CONTROL DEVICE FOR CREATING A PACKER

(71) Applicant: Halliburton Energy Services, Inc., Houston, TX (US)

(72) Inventors: Zachary Ryan Murphree, Dallas, TX (US); Michael Linley Fripp, Carrollton, TX (US); Thomas Jules Frosell, Irving, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 105 days.

(21) Appl. No.: 15/572,910

(22) PCT Filed: Jun. 30, 2015

(86) PCT No.: PCT/US2015/038472
§ 371 (c)(1),
(2) Date: Nov. 9, 2017

(87) PCT Pub. No.: WO2017/003443
PCT Pub. Date: Jan. 5, 2017

(65) Prior Publication Data
US 2018/0119512 A1     May 3, 2018

(51) Int. Cl.
*E21B 43/04* (2006.01)
*E21B 33/12* (2006.01)
*E21B 27/02* (2006.01)

(52) U.S. Cl.
CPC .............. *E21B 43/04* (2013.01); *E21B 27/02* (2013.01); *E21B 33/1208* (2013.01)

(58) Field of Classification Search
CPC ....... E21B 27/02; E21B 33/1208; E21B 43/04
See application file for complete search history.

(56) References Cited

U.S. PATENT DOCUMENTS

| | | | |
|---|---|---|---|
| 3,052,297 | A | 9/1962 | Blydorp |
| 3,984,918 | A | 10/1976 | Chaney |
| 4,035,718 | A | 7/1977 | Chandler |

(Continued)

FOREIGN PATENT DOCUMENTS

| | | |
|---|---|---|
| GB | 2222680 | 3/1990 |
| PL | 397294 | 6/2013 |

(Continued)

OTHER PUBLICATIONS

Dickstein et al., "Labyrinthine Pattern Formation in Magnetic Fluids", Science, New Series, vol. 261, No. 5124, Aug. 20, 1993, pp. 1012-1015.

(Continued)

*Primary Examiner* — Caroline N Butcher
(74) *Attorney, Agent, or Firm* — Kilpatrick Townsend & Stockton LLP

(57) ABSTRACT

An assembly for creating a packer can include a downhole tool positionable within a wellbore. The downhole tool can include an outflow control device that includes a substantially circumferential slot, a port in the slot for receiving a sealant from a reservoir, and a flow restriction device that can be positioned between the substantially circumferential slot and an annulus of the wellbore. The flow restriction device can create a pressure difference between the substantially circumferential slot and the annulus of the wellbore.

20 Claims, 6 Drawing Sheets

(56) References Cited

U.S. PATENT DOCUMENTS

| | | |
|---|---|---|
| 4,222,444 A | 9/1980 | Hamilton |
| 4,269,279 A | 5/1981 | House |
| 4,350,955 A | 9/1982 | Jackson et al. |
| 4,356,098 A | 10/1982 | Chagnon |
| 4,424,974 A | 1/1984 | Mitsuya et al. |
| 4,444,398 A | 4/1984 | Black et al. |
| 4,502,700 A | 3/1985 | Gowda et al. |
| 4,526,379 A | 7/1985 | Raj |
| 4,604,222 A | 8/1986 | Borduz et al. |
| 4,604,229 A | 8/1986 | Raj et al. |
| 4,630,243 A | 12/1986 | MacLeod |
| 4,630,943 A | 12/1986 | Stahl et al. |
| 4,691,774 A | 9/1987 | Nelson |
| 4,802,534 A | 2/1989 | Larson et al. |
| 4,845,988 A | 7/1989 | Russell et al. |
| 4,865,334 A | 9/1989 | Raj et al. |
| 4,991,438 A | 2/1991 | Evans |
| 5,007,513 A | 4/1991 | Carlson |
| 5,092,611 A | 3/1992 | Ehmsen et al. |
| 5,429,000 A | 7/1995 | Raj et al. |
| 5,452,520 A | 9/1995 | Raj et al. |
| 5,474,302 A | 12/1995 | Black et al. |
| 5,475,309 A | 12/1995 | Hong et al. |
| 5,780,741 A | 7/1998 | Raj |
| 5,850,624 A | 12/1998 | Gard et al. |
| 6,216,787 B1 | 4/2001 | Ruttley |
| 6,250,848 B1 | 6/2001 | Moridis et al. |
| 6,257,356 B1 | 7/2001 | Wassell |
| 6,290,894 B1 | 9/2001 | Raj et al. |
| 6,305,694 B1 | 10/2001 | Yamazumi et al. |
| 6,681,849 B2 | 1/2004 | Goodson, Jr. |
| 6,817,415 B2 | 11/2004 | Orban et al. |
| 7,021,406 B2 | 4/2006 | Zitha |
| 7,032,670 B2 | 4/2006 | Zitha |
| 7,063,146 B2 | 6/2006 | Schultz et al. |
| 7,063,802 B2 | 6/2006 | Tsuda et al. |
| 7,159,675 B2 | 1/2007 | Eigner et al. |
| 7,204,581 B2 | 4/2007 | Peeters |
| 7,219,752 B2 | 5/2007 | Wassell et al. |
| 7,428,922 B2 | 9/2008 | Fripp et al. |
| 7,743,825 B2 | 6/2010 | O'Malley et al. |
| 7,763,175 B2 | 7/2010 | DeCoster et al. |
| 7,779,933 B2 | 8/2010 | Sihler et al. |
| 7,950,672 B2 | 5/2011 | Shimazaki et al. |
| 8,056,246 B1 | 11/2011 | Hopper et al. |
| 8,136,594 B2 | 3/2012 | Streich et al. |
| 8,230,918 B2 | 7/2012 | Ameen |
| 8,240,384 B2 | 8/2012 | Miller et al. |
| 8,269,501 B2 | 9/2012 | Schmidt et al. |
| 8,286,705 B2 | 10/2012 | Ocalan et al. |
| 8,328,199 B2 | 12/2012 | Oshita |
| 8,342,244 B2 | 1/2013 | Streich et al. |
| 8,360,170 B2 | 1/2013 | Leuchtenberg |
| 8,419,019 B2 | 4/2013 | Kung |
| 8,689,875 B2 | 4/2014 | Dudley et al. |
| 8,936,095 B2 | 1/2015 | Ocalan et al. |
| 9,163,475 B2 | 10/2015 | Meinke et al. |
| 9,206,659 B2 | 12/2015 | Zhang et al. |
| 9,512,698 B2 | 12/2016 | Donderici et al. |
| 9,551,203 B2 | 1/2017 | Meinke et al. |
| 2003/0037921 A1 | 2/2003 | Goodson, Jr. |
| 2003/0166470 A1 | 9/2003 | Fripp et al. |
| 2004/0055760 A1 | 3/2004 | Nguyen |
| 2004/0084184 A1 | 5/2004 | Orban et al. |
| 2005/0006020 A1 | 1/2005 | Zitha et al. |
| 2005/0109512 A1 | 5/2005 | Zitha |
| 2005/0274524 A1 | 12/2005 | Silguero et al. |
| 2008/0290876 A1 | 11/2008 | Ameen |
| 2009/0008078 A1 | 1/2009 | Patel |
| 2009/0025928 A1 | 1/2009 | Lee |
| 2009/0101364 A1* | 4/2009 | Schafer ............... E21B 33/1208 166/387 |
| 2009/0179385 A1 | 7/2009 | Komino et al. |
| 2009/0218107 A1 | 9/2009 | Chauffe |
| 2010/0019514 A1 | 1/2010 | Steinwender |
| 2010/0126716 A1 | 5/2010 | Joseph |
| 2010/0224360 A1 | 9/2010 | MacDougall et al. |
| 2010/0267594 A1 | 10/2010 | Rana et al. |
| 2011/0042081 A1* | 2/2011 | Streich ............... C09K 8/42 166/269 |
| 2011/0056681 A1 | 3/2011 | Khan |
| 2011/0108277 A1 | 5/2011 | Dudley et al. |
| 2011/0121516 A1 | 5/2011 | Hallundbæk |
| 2011/0127727 A1 | 6/2011 | Hallundbæk |
| 2011/0186297 A1* | 8/2011 | Zhang ............... C09K 8/70 166/308.1 |
| 2011/0192573 A1 | 8/2011 | Defretin et al. |
| 2011/0284213 A1 | 11/2011 | Willberg |
| 2011/0297265 A1 | 12/2011 | Kahoe et al. |
| 2011/0297394 A1 | 12/2011 | VanDelden |
| 2012/0186819 A1* | 7/2012 | Dagenais ............... E21B 43/08 166/310 |
| 2012/0325490 A1 | 12/2012 | Ohta |
| 2013/0020066 A1 | 1/2013 | Ocalan et al. |
| 2013/0091941 A1 | 4/2013 | Huh et al. |
| 2013/0105224 A1 | 5/2013 | Donderici et al. |
| 2013/0112911 A1 | 5/2013 | Mazyar et al. |
| 2013/0119995 A1 | 5/2013 | Wootten |
| 2013/0139565 A1 | 6/2013 | Hedtke |
| 2013/0150267 A1 | 6/2013 | Roddy |
| 2013/0161006 A1 | 6/2013 | Robisson et al. |
| 2013/0169278 A1 | 7/2013 | Bittar et al. |
| 2013/0199650 A1 | 8/2013 | Cabot |
| 2014/0262268 A1 | 9/2014 | Kageler |
| 2015/0013985 A1 | 1/2015 | Parsche |
| 2015/0034332 A1 | 2/2015 | Merron |
| 2015/0315868 A1* | 11/2015 | Fripp ............... E21B 33/10 166/387 |
| 2016/0010424 A1 | 1/2016 | Van Oort et al. |
| 2016/0145968 A1 | 5/2016 | Marya |

FOREIGN PATENT DOCUMENTS

| | | |
|---|---|---|
| WO | 2001061713 | 8/2001 |
| WO | 2005038189 | 4/2005 |
| WO | 2009142779 | 11/2009 |
| WO | 2011153524 | 12/2011 |
| WO | 2013012967 | 1/2013 |
| WO | 2015094266 | 6/2015 |
| WO | 2015094274 | 6/2015 |
| WO | 2015102561 | 7/2015 |
| WO | 2015102563 | 7/2015 |
| WO | 2015102566 | 7/2015 |
| WO | 2015102568 | 7/2015 |
| WO | 2016039719 | 3/2016 |

OTHER PUBLICATIONS

Gollwitzer et al., "The Surface Topography of a Magnetic Fluid - a Quantitative Comparison Between Experiment and Numerical Simulation", Journal of Fluid Mechanics, May 2006, pp. 1-21.

Grundfos, "The Centrifugal Pump", Company Datasheet, Dec. 2003.

Horak et al., "Experimental and Numerical Determination of the Static Critical Pressure in Ferrofluid Seals", Journal of Physics: Conference Series, vol. 412, 2013, pp. 1-6.

Pant et al., "Synthesis and characterization of ferrofluid-conducting polymer composite", Indian Journal of Engineering and Materials Sciences, vol. 11, Aug. 2004., pp. 267-270.

International Patent Application No. PCT/US2015/038472, International Search Report and Written Opinion dated Mar. 28, 2016, 14 pages.

Raj et al., "Advances in ferrofluid technology", Journal of Magnetism and Magnetic Materials, vol. 149, 1995, pp. 174-180.

Rosenweig, "Magnetic Fluid Motion in Rotating Field", Journal of Magnetism and Magnetic Materials, vol. 85, Issues 1-3, Apr. 1990, pp. 171-180.

\* cited by examiner

OUTFLOW CONTROL DEVICE FOR CREATING A PACKER

TECHNICAL FIELD

The present disclosure relates generally to devices for use in a wellbore in a subterranean formation and, more particularly (although not necessarily exclusively), to a packer that may be used for creating zone isolation through a gravel pack or other downhole configuration.

BACKGROUND

Various devices can be utilized in a well that traverses a hydrocarbon-bearing subterranean formation. The well may be divided into zones and to isolate those zones from one another to prevent cross-flow of fluids from the rock formation and other areas into the annulus. For example, a packer may be installed along production tubing in the well to restrict the flow of fluid through an annulus between the tubing and the formation or casing.

DETAILED DESCRIPTION

Certain aspects and features of the present disclosure are directed to packers, and methods of creating packers, that can be deployed downhole in a well system using an outflow control device. The packer can be deployed downhole, even in gravel and other debris environments. The packer can be set and can maintain the desired annulus seal. The packer can be formed by the outflow control device injecting a sealant into the annulus between a downhole tool and the wellbore. In some aspects, the downhole tool can be a tubing string or a tool for creating a bridge plug. The sealant can polymerize and form a solid structure.

The outflow control device can include a slot that extends around a circumference of the downhole tool. A flow restriction device can be positioned between the slot and the annulus of the wellbore. The flow restriction device can create a pressure difference between the circumferential slot and the annulus of the wellbore. A sealant can be injected into the slot via a port in the slot. The difference between the circumferential slot and the annulus of the wellbore can cause the sealant to fill the slot along the entire circumference of the downhole prior to flowing through the flow restriction device into the annulus of the wellbore.

The sealant can also sweep away contaminants axially along the packer (e.g., radially away from a central axis of the wellbore) as the sealant fills the slot and ultimately passes through the flow restriction device into the annulus of the wellbore. Sweeping any contaminants away axially along the packer can increase the performance and reliability of the packer. The annulus of the wellbore can contain gravel or other debris. The packer can be formed in the gravel pack or other debris environment in the annulus.

Figure 1:
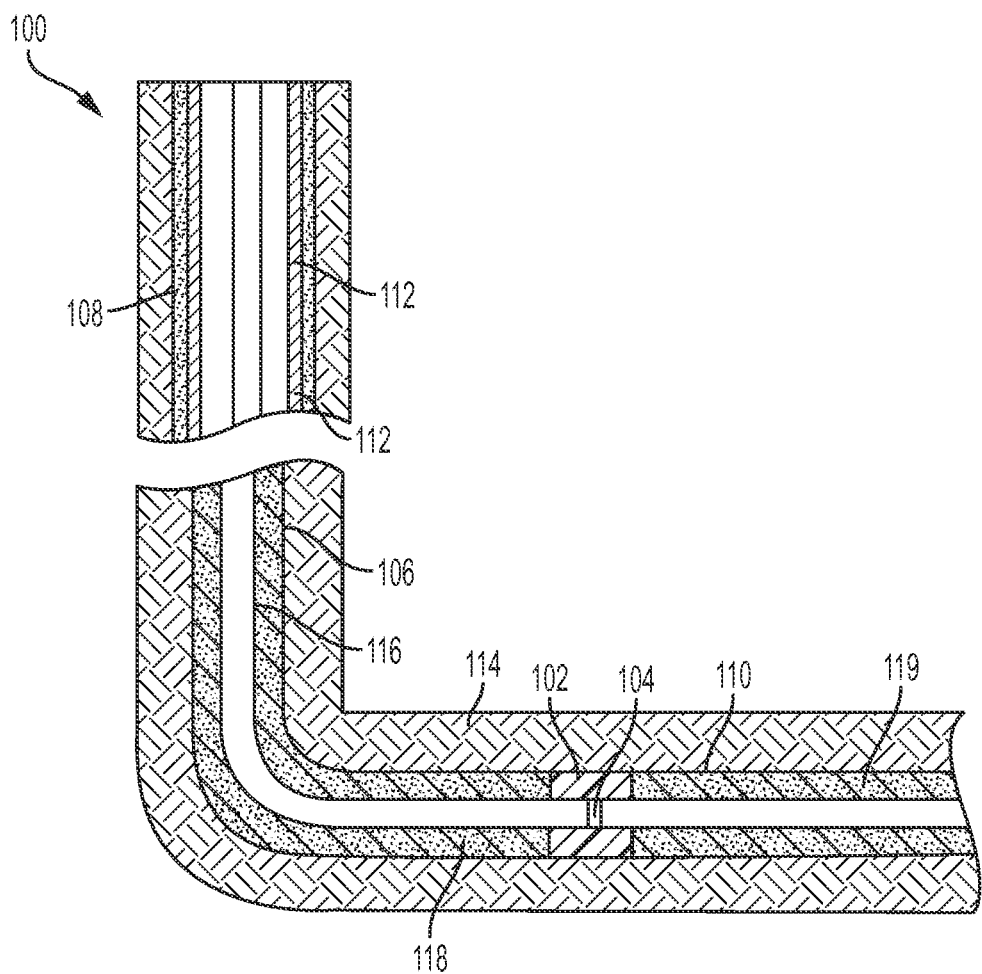
FIG. 1 is a schematic diagram of a well system having a packer, according to an aspect of the present disclosure.

FIG. 1 is a schematic diagram of a well system 100 that includes a packer 102 created using an outflow control device 104 on a downhole tool, for example a tubing string 116. The well system includes a wellbore 106 extending through various earth strata. The wellbore 106 may have a substantially vertical section 108 and a substantially horizontal section 110. The substantially vertical section 108 and the substantially horizontal section 110 may include a casing string 112 cemented at an upper portion of the substantially vertical section 108. The substantially vertical section 108 and the substantially horizontal section 110 may extend through a hydrocarbon bearing subterranean formation 114.

The tubing string 116 can extend from the surface through the wellbore 106 into the subterranean formation 114. The tubing string 116 can provide a conduit for formation fluids, such as production fluids from the subterranean formation 114, to travel to the surface. An annulus 118 can extend between an surface of the tubing string 116 and the wellbore 106. The annulus 118 can be with gravel or other debris to form a gravel pack 119. It may be desirable to one or both of the substantially vertical section 108 and the substantially section 110 into one or more zone. The zones can be separated by one or more packers. While FIG. 1 illustrates a single packer 102, it should be understood that some aspects of the present disclosure multiple zones can be provided and are within the scope of this disclosure.

While FIG. 1 depicts the packer 102 in the substantially horizontal section 110, additionally or alternatively, it may be located in the substantially vertical section 108. Moreover, the packer 102 deployed using the outflow control device 104 can be disposed in a variety of wellbores, including, for example, wellbores having only a substantially vertical section, in open-hole environments, or in cased wells. The packer 102 may be used in injection wells, water wells, geothermal wells without hydrocarbon, carbon sequestration, monitoring wells, or any other appropriate downhole configuration in combination with any type of injection fluid, such as water, steam, carbon dioxide, nitrogen, or any other appropriate fluid.

Figure 2:
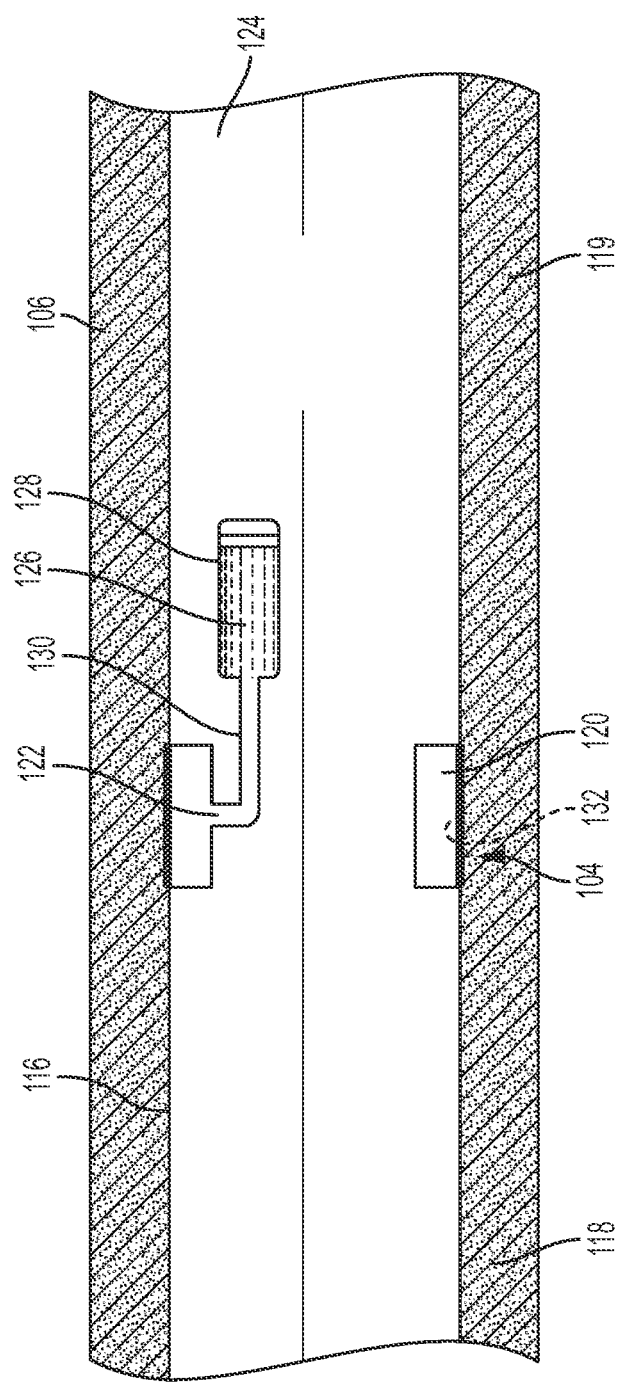
FIG. 2 is a cross-sectional view of a tubing string and an outflow control device of FIG. 1 prior to the formation of the packer, according to an aspect of the present disclosure.

FIG. 2 is a cross-sectional view of the tubing string 116 and the outflow control device 104 prior to the formation of the packer. The outflow control 104 can include a slot (or recess) 120 extending around an outer surface of the tubing string 116. In some aspects, the slot 120 can extend around the entire circumference of the tubing string 116. The slot 120 can include a port 122. In some aspects, the slot 120 can include additional ports. The tubing string 116 can contain a sealant 126. In one aspect, the sealant 126 may be housed in a reservoir 128. In some aspects, the sealant 126 can be a two part material that can be mixed together to cross-link and cure. In other aspects, the sealant 126 can be a single material. The reservoir 128 can be positioned in a recess 124 in the tubing string 116. In some aspects, the reservoir 128 can be positioned on a separate tool or separate tubing and the sealant 126 can be deployed in a remedial operation.

The sealant 126 can be a silicone adhesive, an epoxy, or another suitable material that crosslinks. In some aspects, the sealant 126 can be a cement or another material that hydrolizes. The sealant 126 can also be a material that has a viscosity that increases or a yield strength that increases after deployment from the reservoir 128.

A delivery conduit 130 can extend between the port 122 and the reservoir 128 for carrying the sealant 126 to the slot 120. In some aspects, the reservoir 128 can be coupled directly to the slot 120. A perforated shroud or screen 132 can be positioned between the slot 120 and the annulus 118 of the wellbore 106. In some aspects, the screen 132 can be a screen with an 80-micron pore size. In other aspects, other suitable screen pore sizes can be used. In some aspects, the screen can be metal mesh, slotted shroud, micro-perforated shroud, sintered filter media, or other suitable materials. The screen 132 can create a pressure difference between the slot 120 and the annulus 118 of the wellbore 106. The pressure difference can cause the sealant 126 to completely fill the slot 120 in a circumferential band around the tubing string 116 before expanding in the axial direction across the screen 132 into the gravel pack 119 in the annulus 118.

In some aspects, a rupture disc or other component can block the port The rupture disc can prevent injection of the sealant 126 until deployment of the sealant 126 is desired. To deploy the sealant 126, a force can be applied within the tubing string 116 to force the sealant 126 into the delivery conduit 130 towards the rupture disc in the port 122. The sealant 126 can apply pressure to the rupture disc sufficient to break the rupture disc and pass through the port 122. In some aspects, the rupture disc can be positioned elsewhere, for example in the delivery conduit 130 or at the junction of the delivery conduit 130 and the reservoir 128.

Figure 3:
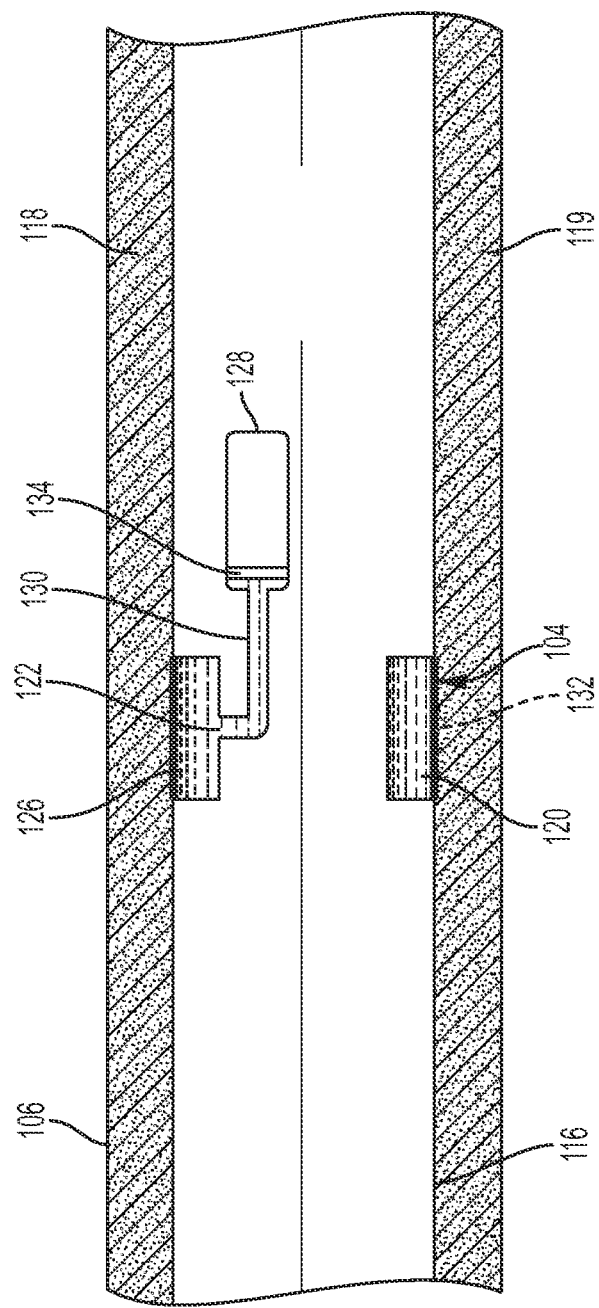
FIG. 3 is a cross-sectional view of the tubing string and the outflow control device of FIGS. 1-2 to deploy a sealant into an annulus, according to an aspect of the present disclosure.

FIG. 3 shows a cross-sectional view of the tubing string 116 and the outflow control device 104 of FIG. 2 as the sealant 126 is deployed. A pressure can be applied to the sealant 126 within the reservoir 128 via a piston 134. The pressure can force the sealant 126 to exit the reservoir 128 and flow through the port 122 via the delivery conduit 130. In some aspects, another ejection device, component, or force that can apply pressure to the sealant 126 can be used instead of the piston 134. The piston 134 can include a spring engagement that can cause movement of the piston 134 when activated. The spring can be used to keep the piston 134 in contact with the sealant 126 to ensure that that the sealant 126 is not contaminated by wellbore fluids present in the annulus 118. Contaminants can interfere with the setting of the sealing. Preventing contamination by wellbore fluids can prevent the sealant 126 from prematurely setting. Contaminants can include, for example and without limitation, pipe dope, completion fluids, acids, drilling fluids, and filter cake materials.

The screen 132 can create a pressure difference between the slot 120 and the annulus 118 of the wellbore 106. For example, the pressure within the slot 120 can be higher than the pressure in the annulus 118. The pressure difference can cause the sealant 126 to completely fill the slot 120, around the entire of the tubing string 116, prior to crossing the screen 132 and entering the annulus 118. FIG. 3 depicts the sealant 126 having filled the slot 120 about the entire circumference of the tubing string 116 just prior to the sealant 126 flowing the screen 132 and entering the annulus 118. The annulus 118 contains a gravel pack 119. In some aspects, the annulus 118 does not contain a gravel pack or debris.

The sealant 126 can be viscous or syrup-like so that it has flow and movement properties. The sealant 126 may have a low yield-strength in the reservoir 128 before it flows into the slot 120. The yield strength of the sealant 126 may increase after flowing into the slot 120. FIG. 3 depicts an active deployment, in that the sealant 126 is forced to exit the reservoir 128 and pass through the delivery conduit 130 and the port 122 into the slot 120 upon pressure applied to the piston 134. In some aspects, a passive deployment of the sealant 126 may be used. For example, the sealant 126 may be in a dissolvable or rupturable bag that is passively deployed. A pressure differential can be used to move or deploy the sealant 126.

In some aspects, an electronically triggered system may be used to release the sealant 126. For example, an electronic rupture disc may be positioned between the port 122 and the reservoir 128. The electronic rupture disc can be used to hold a blocking piston in place. Electronic removal of the electronic rupture disc, can allow the sealant 126 to flow into and circumferentially fill the slot 120 and ultimately fill the annulus 118 and create the annular seal.

Figure 4:
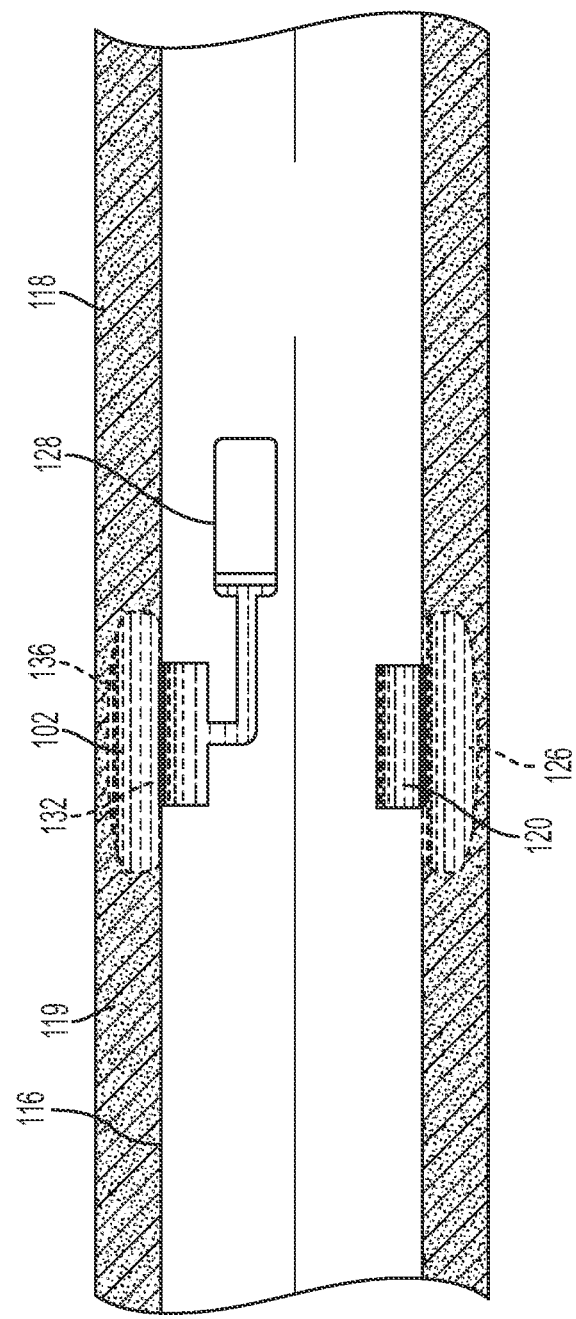
FIG. 4 is a cross-sectional view of the tubing string and the outflow control device of FIGS. 1-3 with the sealant filling an annulus of the wellbore, according to an aspect of the present disclosure.

FIG. 4 shows a cross-sectional depiction of the tubing string 116 and the outflow control device 104 of FIGS. 2 and 3 as the sealant 126 fills the annulus As described above, the sealant 126 can fill the slot 120 that extends the circumference of the tubing string 116 prior to crossing the screen 132 and the annulus 118. The sealant 126 can extend into the spaces between the particles and grains of the gravel pack 119 in the annulus 118. The initial sealant 126 deployed from the reservoir 128 can begin to viscosify prior to the remaining sealant 126 in the reservoir 128 being deployed. The initially viscosifying sealant 126 can serve as a barrier to the later deployed sealant 126 and can force the later deployed sealant 126 to form an annular pack.

The sealant 126 can come in contact with wellbore fluids when it reaches the annulus 118. The wellbore fluids can contain contaminants. Contaminants can accumulate at the interface between the sealant 126 and the wellbore fluids in the annulus 118. Contaminants can affect the curing and performance of the sealant 126, for example, a polymeric sealant can be poisoned when it comes in contact with chemicals in the wellbore fluids. The polymeric sealant that comes in contact with the chemicals can have poor cross-linking as a result. The outflow control device 104 can prevent contaminants in the wellbore fluids in the annulus 118 from affecting the performance and reliability of the packer 102.

The sealant 126 can entirely fill the slot 120 of the outflow control device 104 prior to entering the annulus 118. A leading edge 136 of the sealant 126 can sweep away contaminants axially along the packer 102 as the sealant 126 extends into the annulus 118 of the wellbore 106. In other words, the leading edge 136 of the sealant 126 can sweep contaminants it comes into contact with away from the tubing string 116 towards the wellbore 106.

As the leading edge 136 of the sealant sweeps away the contaminants the sealant 126 following the leading edge 136 can cure fully and can create a strong seal. Sweeping any contaminants away axially along the packer, as opposed to radially, can also prevent a concentration of contaminants where the sealant 126 the wellbore fluids interface. Areas of concentrated contaminants where the 126 and wellbore fluids interface can create leak paths. By sweeping any contaminants away axially along the packer, the sealant 126 can prevent the formation of leak paths and can form a stronger packer 102 that can have performance and reliability. The sealant 126 can form a fluid isolation barrier between zones in the wellbore when cured to form the packer 102.

Figure 5:
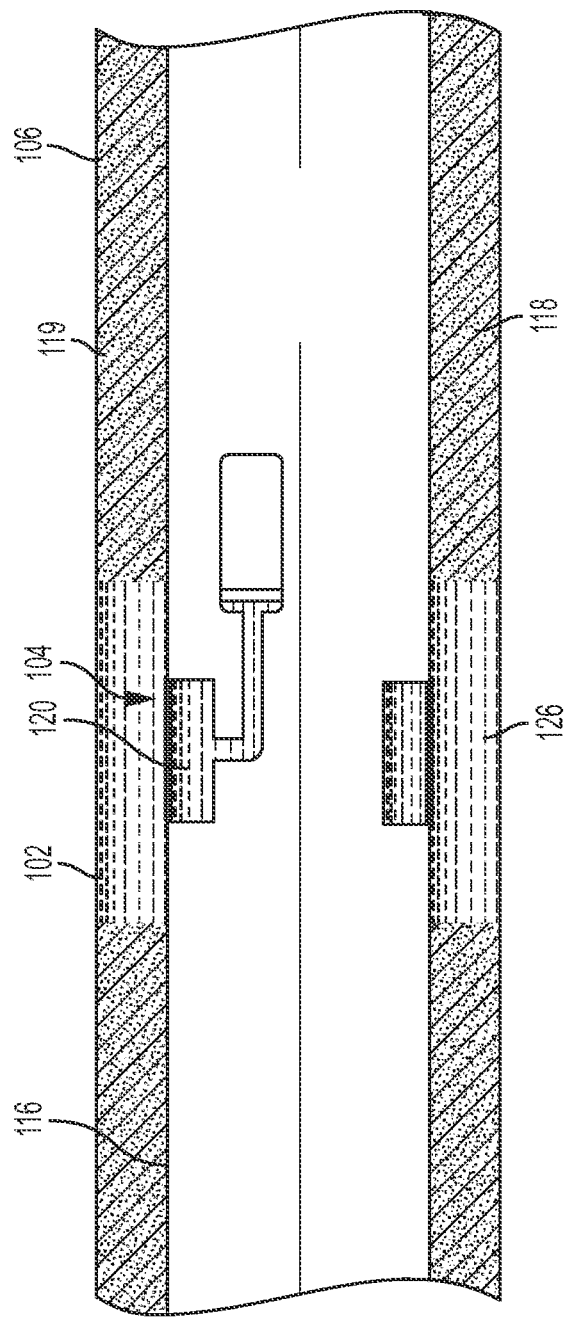
FIG. 5 is a cross-sectional view of the tubing string and the outflow control device of FIGS. 1-4 with the packer fully formed, according to an aspect of the present disclosure.

FIG. 5 shows a cross-sectional depiction of the tubing string 116 and the outflow control device 104 of FIGS. 2-4 with the packer 102 fully formed. The packer 102 is formed by the sealant 126 extending from the slot 120, through the gravel pack 119 in the annulus 118 to the wellbore 106.

While FIGS. 1-5 depict the outflow control device 104 on the tubing string 116 being used to form packer 102, the outflow control device 104 can also be positioned on a downhole tool to form bridge plugs. In some aspects, the downhole tool can be positioned downhole using a wireline.

In some aspects, the outflow control device 104 can be used to create a seal on the exterior of a tubing string, as shown in FIGS. 1-4. In some aspects, the outflow control device 104 can be used to create a seal on the interior of a tubing string. The outflow control device 104 can be used with shunt tubes as well as primary tubing. The seal created using the outflow control device 104 can be made in open holes or in cased holes.

Figure 6:
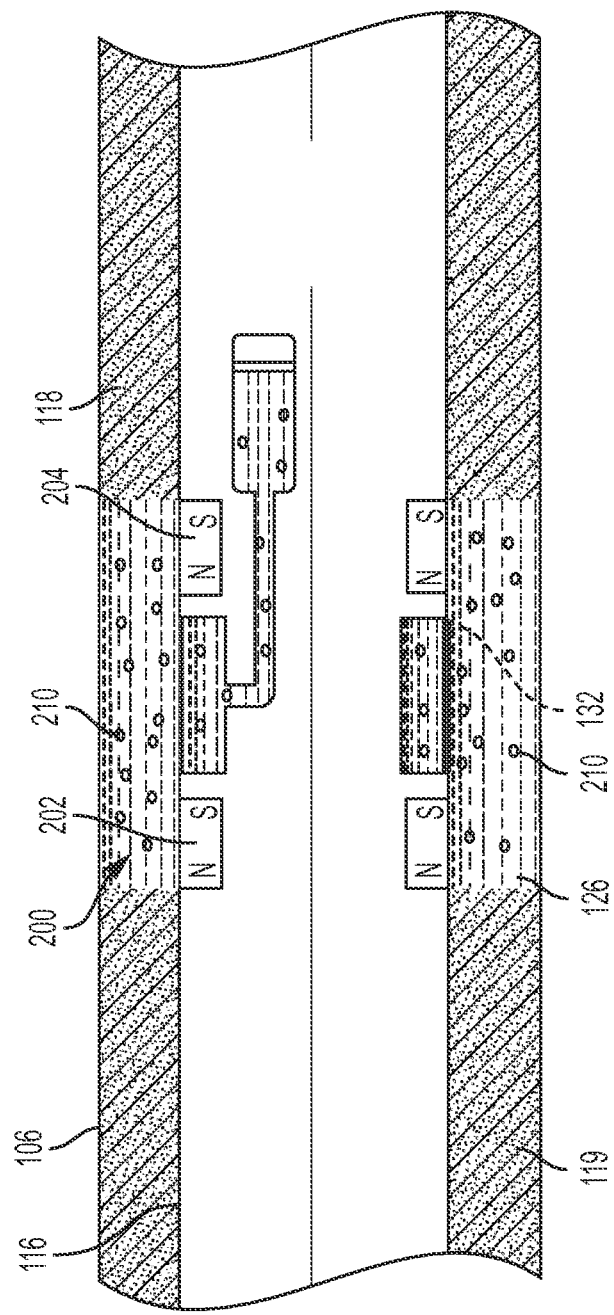
FIG. 6 is a cross-sectional view of a packer, according to an aspect of the present disclosure.

FIG. 6 shows a cross-sectional depiction of a packer 200 with the sealant 126 being held in place by magnets 202, 204, according to another aspect of the present disclosure. Magnets 202, 204 can be positioned on the tubing string 116. some aspects, the magnets 202, 204 may be positioned on the inner diameter of tubing string 116, on the outer diameter of the tubing string 116, embedded in the tubing string 116, run down on a separate tool, or provided in any other configuration. A magnetic field can be created by the magnets 202, 204.

The sealant 126 may include a combination of a polymer precursor material and magnetically responsive particles 210 to form a ferromagnetic sealant. The polymer precursor can be a suitable material that can carry magnetically responsive particles 210 and cure or otherwise set upon appropriate forces, environmental conditions, or time. The magnetically responsive particles 210 may be particles of a ferromagnetic material, such as iron, nickel, cobalt, any ferromagnetic, diamagnetic or paramagnetic particles, any combination thereof, or any other particles that can receive and react to a magnetic force. Any particles that are attracted to magnets can be used in the sealant 126 and are considered within the scope of this disclosure. Any suitable particle size can be used for the magnetically responsive particles 210. For example, the particles may range from the nanometer size (e.g., about 100 nanometers to about 1000 nanometers) up to the micrometer size (e.g., up to about 100 microns). In some aspects, other particles sizes may be used.

The sealant 126 can be deployed into the slot 120. After the sealant 126 has filled the entire slot 120, around the circumference of the tubing string 116, the sealant can pass through the screen 132, enter the annulus 118 containing the pack 119, and pass through the magnetic field of magnets 202, 204. Passage of sealant 126 through the magnetic field can cause the magnetically responsive particles 210 to align with the magnetic field. In some aspects, at least a portion of the magnetic field extends radially from the magnets 202, 204. In some aspects, magnets 202, 204 can project a magnetic field outwardly of the outer diameter of tubing string 116.

Alignment of the magnetically responsive particles 210 with the magnetic field of the magnets 202, 204 can cause the magnetically responsive particles 210 to hold the sealant 126 between magnets 202, 204. Subsequent movement of the sealant 126 can be limited due to arrangement of the magnetically responsive particles 210. The north and south polarities of the magnets 202, 204 as well as the placement, number, and orientation of the magnets 202, 204 are shown for non-limiting illustrative purposes only and may be changed.

As shown in FIG. 6, once the sealant 126 has filled the slot 120 and has passed through the screen 132 into the annulus 118 the sealant 126 containing magnetically responsive particles 210 can be halted from moving further and held in place by the magnetic field created by magnets 202, 204. The placement and location of the magnets 202, 204 can be altered as desired to create the desired length of the packer 200. In one aspect, the magnets 202, 204 may act like cup packers and keep the sealant 126 in a desired area of the annulus 118. The sealant 126 can be trapped in the desired area by the magnets 202, 204. The trapped sealant 126 can be caused to fill the space between the magnets 202, 204 sufficiently before it is displaced beyond the magnets 202, 204. The magnetic force from the magnets 202, 204 can create the magnetic force or field that can cause the sealant 126 to solidify, stop flow, and form a packer in use.

EXAMPLE #1

An assembly can include a downhole tool positionable the wellbore. The downhole tool can include an outflow control device. The outflow control device can include a substantially circumferential slot. The substantially circumferential slot can include a port for receiving a sealant from a reservoir. A flow restriction device can be positioned between the substantially circumferential slot and an annulus of the wellbore for creating a pressure between the substantially circumferential slot and the annulus of the wellbore.

EXAMPLE #2

The assembly of Example #1 may feature the reservoir being positionable in a recess in the tubing string.

EXAMPLE #3

The assembly of any of Examples #1-2 may feature a screen as the flow restriction device.

EXAMPLE #4

The assembly of any of Examples #1-3 may feature the sealant being a material that has a yield-strength that increases after injection into the substantially circumferential slot.

EXAMPLE #5

The assembly of any of Examples #1-4 may also include a gravel pack positioned within the annulus of the wellbore.

EXAMPLE #6

The assembly of any of Examples #1-5 may also include an ejection device. The ejection device can eject the sealant from the reservoir.

EXAMPLE #7

The assembly of any of Examples #1-6, further comprising a tubing string that is the downhole tool.

EXAMPLE #8

An assembly can include a downhole tool positionable within a wellbore that includes an outflow control device. The outflow control device can include a substantially circumferential slot. The substantially circumferential slot can include a port for receiving a sealant. The outflow control device can also include a flow restriction device that can be positioned above the substantially circumferential slot for creating a pressure difference between the substantially circumferential slot and an annulus of the wellbore. A reservoir can positioned within a recess in the downhole tool. The reservoir can contain the sealant. A delivery conduit can couple the reservoir to the port. The assembly can also include an ejection device. The ejection device can eject the sealant from the reservoir into the delivery conduit.

EXAMPLE #9

The assembly of Example #8 may feature the reservoir being positionable on the tool.

EXAMPLE #10

The assembly of any of Examples #8-9 may feature a screen as the flow restriction device.

EXAMPLE #11

The assembly of any of Examples #8-10 may feature the sealant being a material that has a yield-strength that increases after ejection from the reservoir.

EXAMPLE #12

The assembly of any of Examples #8-11 may also include a gravel pack positioned within the annulus of the wellbore.

EXAMPLES #13

The assembly of any of Examples #8-12 may feature a tubing string that is the downhole tool.

EXAMPLES #14

The assembly of any of Examples #8-13 may also include at least one magnet positioned on or within the downhole tool for creating a radially extending magnetic field. The magnetic field can act on the sealant to position the sealant relative to the at least one magnet.

EXAMPLE #15

An assembly can include a downhole tool that includes a flow control device. The flow control device can include a slot that extends at least a portion of a circumference of the downhole tool. The slot can include a port for receiving a sealant. The outflow control device can also include a flow restriction device that is positioned between an inner area of the slot and an outer area of the slot. The flow restriction device can create a pressure difference the inner area of the slot and the outer area of the slot. The assembly can also a reservoir for containing the sealant.

EXAMPLE #16

The assembly of Example #15 may feature the slot extending around an entire circumference of the downhole tool.

EXAMPLE #17

The assembly of any of Examples #15-16 may feature a screen as the flow restriction device.

EXAMPLE #18

The assembly of any of Examples #15-17 may feature the sealant being a material that has a yield-strength that increases after injection into the slot.

EXAMPLE #19

The assembly of any of Examples #15-18 may further include a delivery conduit that couples the reservoir to the port.

EXAMPLES #20

The assembly of any of Examples #15-19 can further include an ejection device. The ejection device can eject the sealant from the reservoir into the delivery conduit.

The foregoing description of certain aspects, including illustrated aspects, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. An assembly comprising:
    a downhole tool positionable within a wellbore comprising:
        an outer surface that defines an outer circumference of the downhole tool, and
        an outflow control device comprising:
            a slot extending through the outer surface of the downhole tool, the slot extending around substantially the entire outer circumference of the downhole tool;
            a port extending through a surface that defines the slot for receiving a sealant from a reservoir; and
            a flow restriction device positioned between the slot and an annulus of the wellbore for creating a pressure difference between the slot and the annulus of the wellbore.

2. The assembly of claim 1, wherein the reservoir is positionable in a recess in the downhole tool.

3. The assembly of claim 1, wherein the flow restriction device is a screen.

4. The assembly of claim 1, wherein the sealant is a material that has a yield-strength that increases after injection into the slot.

5. The assembly of claim 1, further comprising a gravel pack positioned within the annulus of the wellbore.

6. The assembly of claim 1, further comprising an ejection device for ejecting the sealant from the reservoir.

7. The assembly of claim 1, wherein the downhole tool is a tubing string.

8. An assembly comprising:
    a downhole tool positionable within a wellbore, the downhole tool including a tubing string including an outflow control device comprising:
        a slot extending through an outer surface of the tubing string, the slot extending substantially entirely around an outer circumference of the tubing string;
        a port extending through a surface that defines the slot for receiving a sealant; and a flow restriction device positioned above the slot for creating a pressure difference between the slot and an annulus of the wellbore;

a reservoir for containing the sealant;

a delivery conduit that couples the reservoir to the port; and an ejection device for ejecting the sealant from the reservoir into the delivery conduit.

9. The assembly of claim 8, wherein the reservoir is positionable on an additional tool that is positionable within in the wellbore.

10. The assembly of claim 8, wherein the flow restriction device is a screen.

11. The assembly of claim 8, wherein the sealant is a material that has a yield-strength that increases after ejection from the reservoir.

12. The assembly of claim 8, further comprising a gravel pack positioned within the annulus of the wellbore.

13. The assembly of claim 8, wherein the downhole tool is a tubing string.

14. The assembly of claim 8, further comprising at least one magnet positioned on or within the downhole tool for creating a radially extending magnetic field that acts on the sealant to position the sealant relative to the at least one magnet.

15. An assembly, comprising: a downhole tool including a flow control device comprising:

a slot extending partially through an outer surface of the downhole tool, the slot extending at least substantially entirely around an outer circumference of the downhole tool;

a port extending through a surface that defines the slot for receiving a sealant; and a flow restriction device positioned between an inner area of the slot and an outer area of the slot for creating a pressure difference between the inner area of the slot and the outer area of the slot; and a reservoir for containing the sealant.

16. The assembly of claim 15, wherein the slot extends entirely around the outer circumference of the downhole tool.

17. The assembly of claim 15, wherein the flow restriction device is a screen.

18. The assembly of claim 15, wherein the sealant is a material that has a yield-strength that increases after injection into the slot.

19. The assembly of claim 15, further comprising a delivery conduit that couples the reservoir to the port.

20. The assembly of claim 15, further comprising an ejection device for ejecting the sealant from the reservoir into a delivery conduit.

* * * * *